United States Patent [19]
VandenBurg

[11] 4,023,585
[45] May 17, 1977

[54] WATERING DEVICE

[76] Inventor: Arlow L. VandenBurg, 312 N. 14th St., Bismarck, N. Dak. 58501

[22] Filed: Feb. 17, 1976

[21] Appl. No.: 658,740

[52] U.S. Cl. ..................................... 137/80; 47/2; 239/70; 137/624.12
[51] Int. Cl.² ................... B05B 12/12; B05B 12/02
[58] Field of Search ............... 47/1, 2; 239/70, 75, 239/67; 137/79–80, 624.12, 624.11

[56] References Cited
UNITED STATES PATENTS

| | | | |
|---|---|---|---|
| 2,358,999 | 9/1944 | Ray | 137/80 X |
| 2,991,938 | 7/1961 | Norcross | 239/70 X |
| 3,270,460 | 9/1966 | Wild | 47/2 |
| 3,580,504 | 5/1971 | Benham | 239/70 |
| 3,638,682 | 2/1972 | Heyer et al. | 137/624.12 |
| 3,669,352 | 6/1972 | Zaphiris | 239/70 |
| 3,747,619 | 7/1973 | Wacker et al. | 137/80 |
| 3,911,955 | 10/1975 | Link | 239/70 X |
| 3,912,167 | 10/1975 | Simon | 239/70 X |

*Primary Examiner*—Robert E. Bagwill
*Attorney, Agent, or Firm*—Robert E. Kleve

[57] ABSTRACT

The invention comprises a watering device for watering gardens and the like without constant attention. The device has a box-like construction and has an L-shaped passageway therethrough with an inlet and outlet for connection between the sprinkler and a source of water at the opposite ends of the passageway. A solenoid operated valve is mounted in the passageway, with a solenoid upon actuation moving the valve to open the passageway. A timer is mounted on top of the box to actuate the solenoid at a selected hour of the day to thereby allow water to flow through the passageway to the sprinkler for sprinkling, which timer will maintain the solenoid actuated for a selected amount of time. A thermostat is mounted to the top of the box which actuates the solenoid when the temperatures reach the danger of frost (35° F. or below), which solenoid opens the valve and allows water to travel through the passageway to the sprinkler for sprinkling gardens and the like to prevent the frost from damaging produce in the garden.

1 Claim, 5 Drawing Figures

WATERING DEVICE

This invention relates to watering devices more particularily the invention relates to automatic watering devices.

It is an object of the invention to provide a novel compact automatic watering device for attachment in a section of hose line leading to a sprinkler which will automatically turn on the water to sprinkle at a selected time of day and keep the sprinkler on for a selected amount of time and will alternately automatically turn on the sprinkler if the temperature nears freezing or nears the danger of frost, so that the sprinkler will automatically sprinkle a garden or the like so that the frost will not damage the garden.

It is another object of the invention to provide a novel box-like compact sprinkler actuation device which will electrically actuate a valve to allow water to reach the sprinkler at a selected time of day and for a selected amount of time, and which alternately, will automatically allow water to reach the sprinkler for sprinkling if the temperature nears freezing or the danger of frost, so that the sprinkler will automatically sprinkle a garden and the like so that frost will not damage the garden.

Further objects and advantages of the invention will become apparent as the description proceeds and when taken in conjunction with the accompanying drawing wherein.

Briefly stated, the invention comprises a box-like device having an L-shaped passageway structure therethrough with a solinoid operated valve in the passageway, said passageway structure has an inlet and outlet connection at its opposite ends for attachment between the sections of the hose leadng from the source of water to the sprinkler and timing mechanism mounted on top of said box to automatically acutate said valve to open the passageway at a selected time of day and for a selected amount of time, a thermostat mounted on top of said box, a switch to alternately actuate either said timer or said thermostat, with said thermostat when activated automaticaly acutating said solenoid to open said valve when the temperature reaches near freezing and there is danger of frost so that the sprinkler will automatically sprinkle gardens and the like to prevent damage thereto from the frost.

Figure 1:
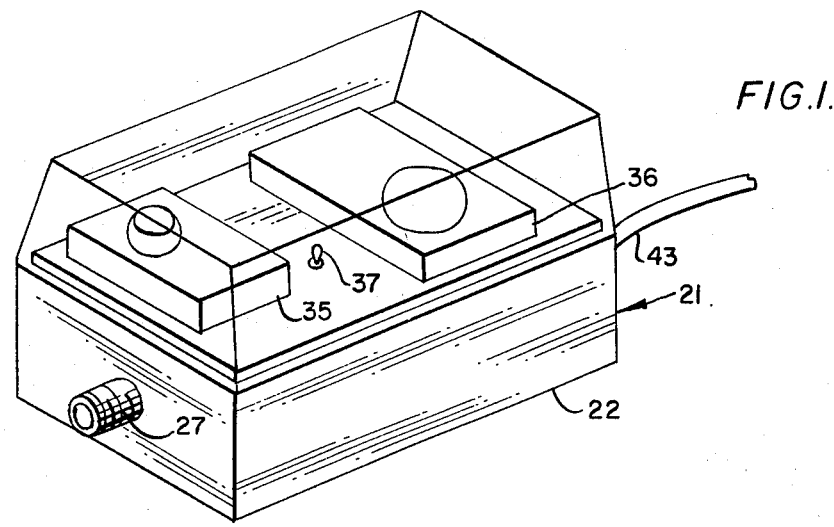
FIG. 1 is a perspective view of the automatic watering device.
Figure 2:
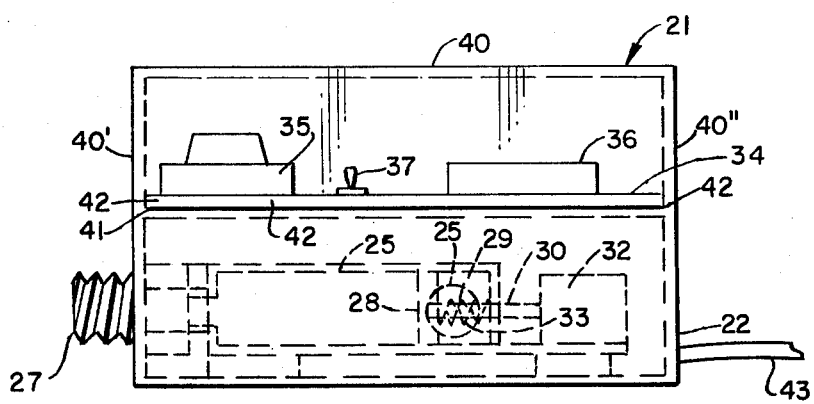
FIG. 2 is a front elevational view of the automatic watering device.
Figure 3:
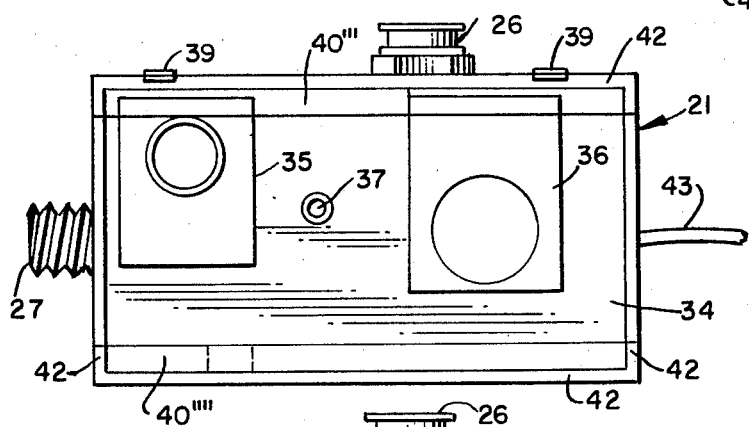
FIG. 3 is a top plan view of the automatic watering device.
Figure 4:
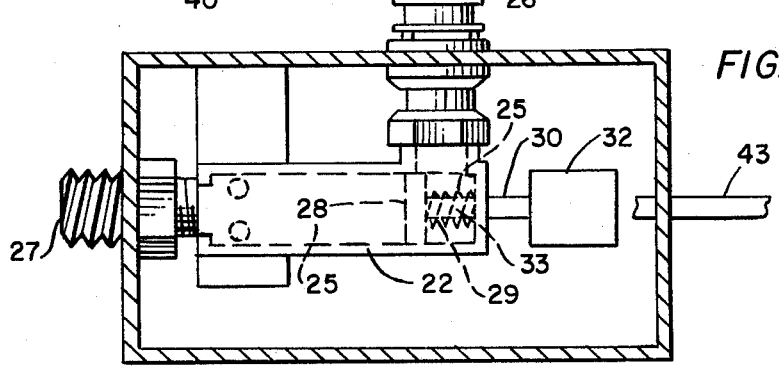
FIG. 4 is a crossectional view of the automatic watering device taken along line 4—4 of FIG. 2, illustrating the L-shaped passageway and the solenoid actuated valve.
Figure 5:
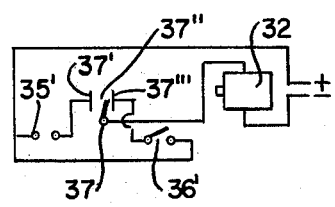
FIG. 5 is a schematic diagram of the electrical circuit for operating the device.

Referring more particularly to the drawing, in FIGS. 1-4, inclusive, the automatic watering device 21 is illustrated as having a hollow box 22 with a conventional solenoid operated valve 22 mounted therein. The valve has an L-shaped passageway structure 25 with an inlet connection 26 and an outlet connection 27. A valve member 28 is slidably mounted with the passageway at the elbow of the passageway structure and the valve is fixed to a rod 29 which extends out of the water through a hole and is fixed to the plunger 30 of a solenoid 32. A spring 33 is mounted coaxially on the rod 29 with the passageway and urges the valve to its closed position shown in FIGS. 2 and 4. Upon energizing of the coil 33 of the solenoid the magnetic force pulls the plunger from left to right from its position shown in solid lines to its position shown in dashed lines, which opens the passageway and allows water to flow through the inlet connection into the L-shaped passageway structure and out the outlet of the passageway structure.

The box 22 has a top panel 34 and a conventional thermostat 35 is fixed on top of the top panel. A three way switch 37 is also mounted on the top panel of the box 22. A timer 36 is also mounted on the top panel of the box.

The three way switch 37 has three positions, a left position 37' which actuates only the thermostat, so that the thermostat can actuate the solenoid, a neutral position 37'' whereby neither the timer nor the thermostat is actuated, and a right position 37''' which actuates only the timer so that the timer may actuate the coil of the solenoid.

A clear plexiglass cover 38 is pivotally mounted to the back of the box 22 by a pair of hinges 39 and pivots closed over the top of the timer and thermostat to provide a water proof seal and cover to prevent rain from falling on the timer and thermostat. The cover 38 has a top panel portion 40, side 40', and 40'', and front and rear panels 40''' and 40'''' fixed together. The lower edges 41 of the cover 38, when the cover is closed, fit in stepped down or groove position 42 which extends around the outer edge of the top panel.

OPERATION

The automatic watering device is operated as follows:

A first section of garden hose will have its one end attached to the outdoor faucet and its other end of the hose attached to the inlet socket 26. The inlet socket 26 is of a conventional structure construction having internally threading and being rotatable on the passageway structure with a relatively watertight collar seal between the socket and the passageway structure so that socket 26 may be rotated to thread the socket onto the other end of the first section of hose. One or more additional sections of hose may be connected together with the socket end of the additional sections attached to the outlet 27. The other end of the additional section is threaded onto the conventional socket of a sprinkler whereby water coming from an outdoor faucet must pass through the L-shaped passageway of the watering device, and the watering device is spaced far enough from the outdoor faucet so that it may rest on the ground and the watering device is spaced far enough from the sprinkler so that it will not normally be sprinkled upon.

The timer 36 is of a conventional construction and conventional type which automatically closes an electrical switch 36' at a selected time of day each day and will automatically keep the electrical switch closed for a selected amount of time. The watering device will be plugged into a conventional household plug by its cord connection 43 which has a conventional plug at its outer end (not shown).

If it is desired to automatically sprinkle a garden at a selected time of day for a selected amount of time each day, the switch 37 will be switched to its right position 37''' so that current flows from electric line position 44 through the switch 37 to the timer. When the timer 36 reaches the selected time it will close the timer switch 36' which enables the electric current to flow through the cord along line 46 through the timer switch 36' and switch 37 and through the solenoid which energizes the solenoid. The plunger of the solenoid pulls the valve from left to right to open the passageway, thereby allowing water to flow from the faucet through the L-shaped passageway to the sprinkler, and the timer will keep the switch 36' closed for the selected amount of time so that the solenoid will remain actuated for the selected amount of time and the sprinkler will continue to sprinkle for the selected amount of time. At the end of the selected amount or interval of time the timer will automatically open switch 36' which deenergizes the solenoid. The spring will push the valve back to its closed position, thereby shutting off the water to the sprinkler.

If it is desired to use the automatic watering device to water a garden or lawn if the temperature drops near frost level of freezing level, the switch 37 will be switched to its left position 37', thereby allowing current to flow from the positive side through switch 37 to switch 35'. The thermostat 35 will be set normally from about 35° above zero. If the temperature in the air drops to 35° above zero, the thermostat, of a conventional construction, will automatically close switch 35' now allowing current to flow from the positive side through switch 35' and through switch 37 and through the coil of the solenoid back to ground, thereby energizing the solenoid.

The energizing of the solenoid moves the valve from left to right opening the passageway in the L-shaped passageway allowing water to flow from the outdoor faucet through the L-shaped passageway to the sprinkler to sprinkle the garden or lawn.

The solenoid will remain energized as long as the temperature in the air is near or at 35° above zero or below 35° above zero F.

It has been found that it is desirable to sprinkle gardens particularly in the fall of the year when the temperature drops to 35° above or below 35° above zero at night because sprinkling the garden and the produce growing in the garden with water when frost occurs is effective in acting to prevent the garden produce from being ruined by the frost, if the temperature does not drop drastically below freezing or frost temperatures.

Thus it will be seen that a novel automatic watering device has been provided which will automatically sprinkle water at a certain time of day for a selected amount of time or will automatically sprinkle water if the temperature drops below a certain level to prevent garden produce from being ruined by the frost.

It will be obvious that various changes and departures may be made to the invention without departing from the spirit thereof and accordingly, it is not intended that the invention be limited to that specifically described in the specification as illustrated in the drawing but only as set forth in the appended claims wherein.

What is claimed is:

1. An automatic garden and lawn watering device for watering gardens and the like comprising a rectangular box having a conduit member therein, said box having an inlet bore adjacent one end of said conduit, with an inlet bore connection mounted to said one end of said conduit adjacent said bore in said box, said inlet hose connection being for attachment to a source of water through a hose connection, said box having an outlet bore with an outlet hose connection mounted to said other end of said connection, said outlet hose connection being for attachement to a sprinkler through another hose connection, a valve in said conduit, a solenoid mounted within the box having a coil and a plunger with a rod connected to said plunger to said valve whereby actuation of said solenoid moves said plunger to move said valve to open said conduit spring return means to return said plunger to close said conduit and deactuation of said solenoid allows said spring means to move said plunger to close said conduit, a timer mounted to said box having a timer switch to activate said solenoid in said box, a thermostat mounted on said box having a thermostatic switch on said box to activate said solenoid, a first switch on said box movable to either a first or second position respectively, to activate either said time or actuate said thermostat which in turn through its thermostatic switch actuates said solenoid, said timer, when activated by said first switch in its first position, having means connected to said timer switch whereby when the timer reaches a selected time of day the timer will close the time switch to activate the solenoid to open the valve and allow water to flow through the conduit in the box to the sprinkler to enable the sprinkler to sprinkle gardens and the like and the timer will keep the time switch closed for a selected amount of time, so that the water can continue to flow through the conduit to the sprinkler to sprinkle for a selected amount of time, said first switch being movable to a second position to deactivate said timer and actuate said thermostat, said thermostat having means when activated whereby the thermostat may be set near the first level and when the temperature nears frost level, the thermostat will automatically close the thermostatic switch to activate the solenoid to open the passageway, so that water may flow through the conduit in said box to the sprinkler to sprinkle gardens and the like for so long as the temperature is near the frost level or below, with the sprinkling of the water on the producer's gardens acting to prevent damage to produce in the garden.

* * * * *